United States Patent
Shiozawa

(10) Patent No.: US 8,000,211 B2
(45) Date of Patent: Aug. 16, 2011

(54) OPTICAL DISC APPARATUS AND METHOD FOR CONTROLLING THE SAME

(75) Inventor: Manabu Shiozawa, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 616 days.

(21) Appl. No.: 12/048,250

(22) Filed: Mar. 14, 2008

(65) Prior Publication Data

US 2008/0225674 A1   Sep. 18, 2008

(30) Foreign Application Priority Data

Mar. 14, 2007  (JP) .................................. 2007-064336

(51) Int. Cl.
*G11B 7/00* (2006.01)
(52) U.S. Cl. ...................................... 369/116; 369/120
(58) Field of Classification Search ............... 369/112.1, 369/47.5, 47.51, 47.1, 47.52, 116, 120, 121, 369/53.2, 122
See application file for complete search history.

(56) References Cited

U.S. PATENT DOCUMENTS

| | | | |
|---|---|---|---|
| 5,491,682 A * | 2/1996 | Dohmeier et al. | 369/124.12 |
| 6,657,935 B2 * | 12/2003 | Eguchi et al. | 369/59.1 |
| 7,173,898 B2 * | 2/2007 | Nishi et al. | 369/116 |
| 2004/0022152 A1 * | 2/2004 | Hayashi | 369/53.2 |
| 2004/0125724 A1 | 7/2004 | Miyake | |
| 2007/0121446 A1 * | 5/2007 | Shiozawa et al. | 369/47.5 |

FOREIGN PATENT DOCUMENTS

| | | |
|---|---|---|
| JP | 2003-257072 | 9/2003 |
| JP | 2003-308623 | 10/2003 |
| JP | 2004-199755 | 7/2004 |

\* cited by examiner

*Primary Examiner* — Nabil Z Hindi
(74) *Attorney, Agent, or Firm* — Antonelli, Terry, Stout & Kraus, LLP.

(57) ABSTRACT

An optical disc apparatus capable of obtaining an effect to reduce the laser noise without shortening the laser diode service life or increasing the power consumption. The optical disc apparatus includes a laser diode for emitting a laser beam, a laser driver for driving the laser diode, a detector for monitoring a first power emitted from the laser diode, a detector for monitoring a second power applied to an optical disc, and an attenuator for attenuating the first power. The light attenuation factor of the attenuator is changed by the ratio between the first power and the second power.

13 Claims, 8 Drawing Sheets

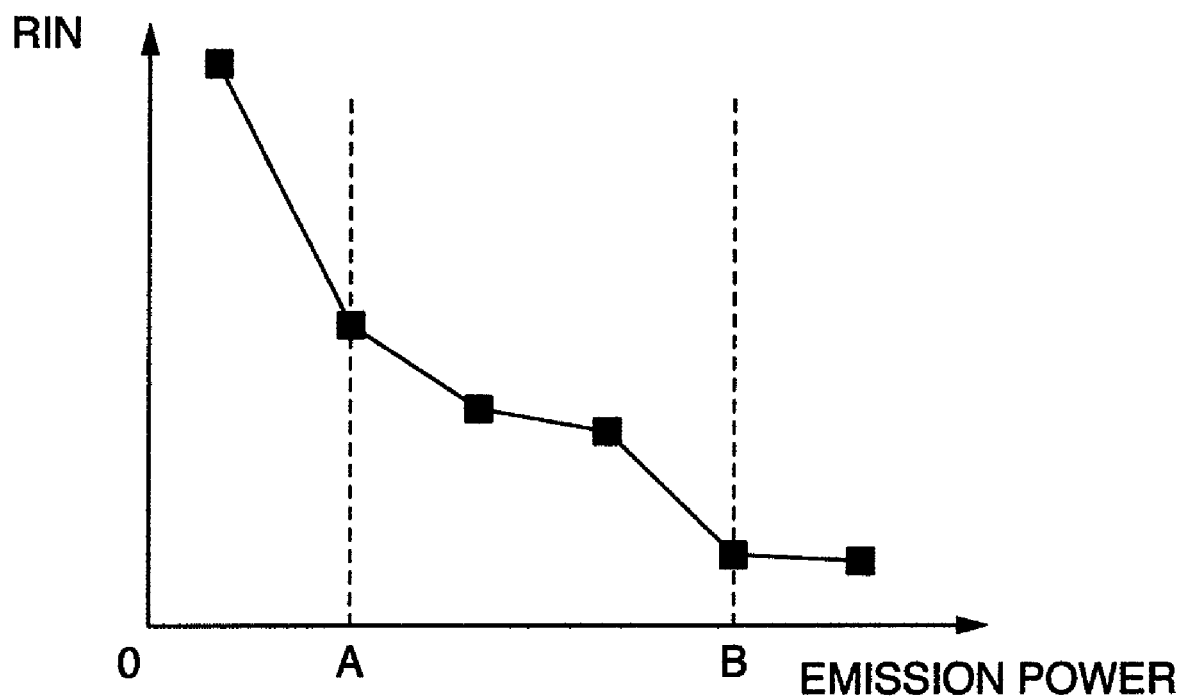

FIG.4

INITIAL OPTICAL SYSTEM EFFICIENCY $\alpha$

|  | $\alpha_L$ | $\alpha_M$ | $\alpha_H$ |
|---|---|---|---|
| $P_H$ | $\eta 11$ | $\eta 12$ | $\eta 13$ |
| $P_M$ | $\eta 21$ | $\eta 22$ | $\eta 23$ |
| $P_L$ | $\eta 31$ | $\eta 32$ | $\eta 33$ |

REPRODUCTION POWER P

LIGHT ATTENUATION FACTOR $\eta$

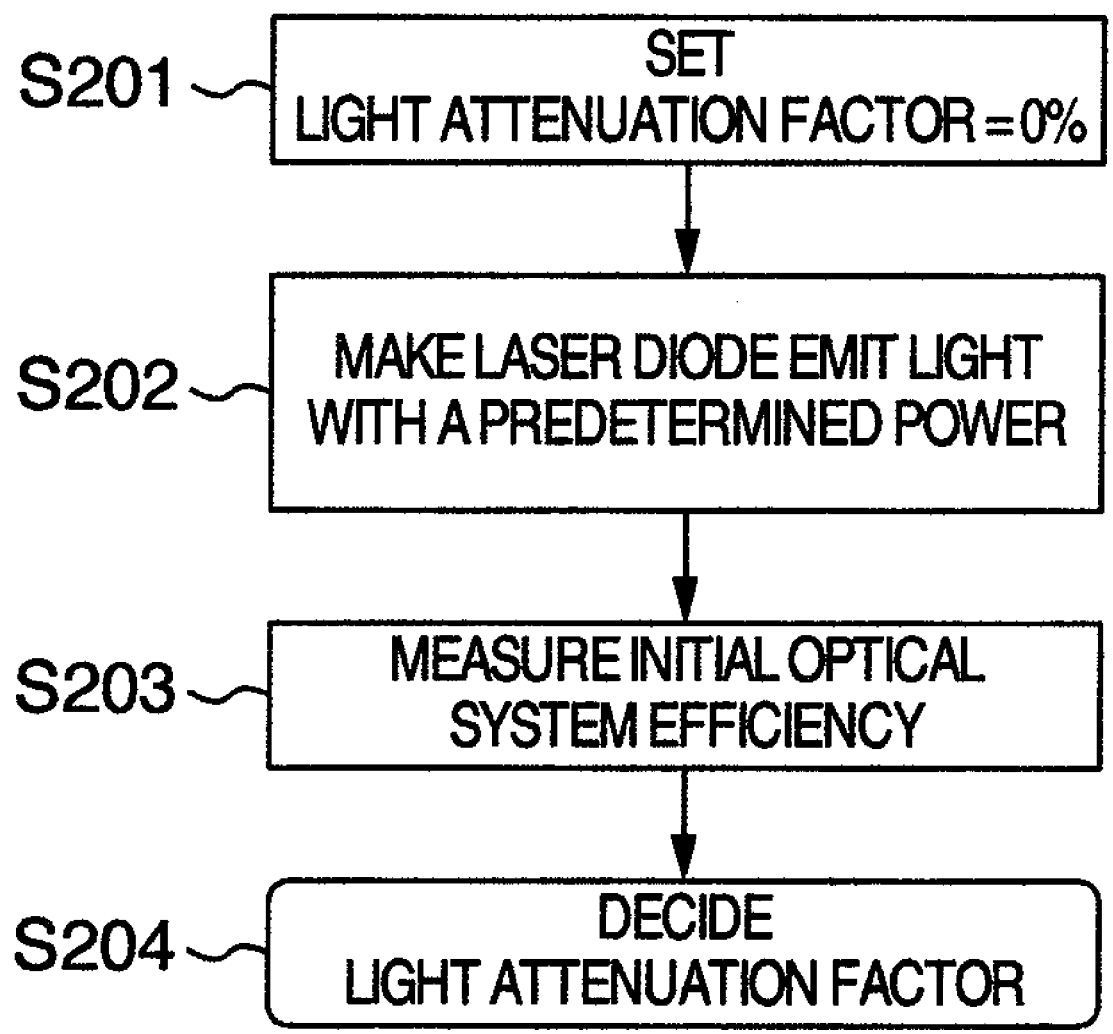

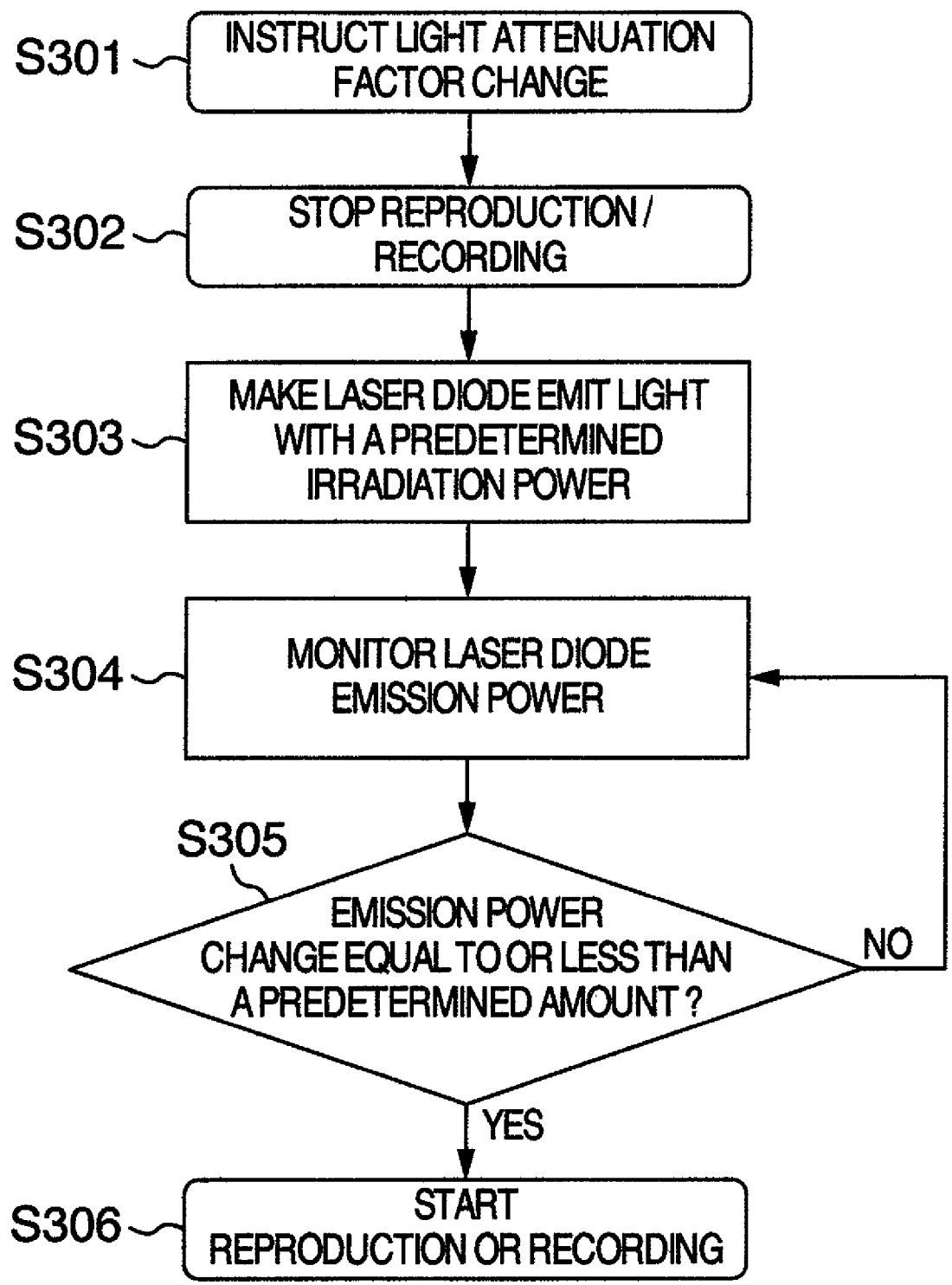

OPTICAL DISC APPARATUS AND METHOD FOR CONTROLLING THE SAME

INCORPORATION BY REFERENCE

The present application claims priority from Japanese application JP2007-064336 filed on Mar. 14, 2007, the content of which is hereby incorporated by reference into this application.

BACKGROUND OF THE INVENTION

The present invention relates to an optical disc apparatus which performs recording or reproduction while reducing a laser noise of a laser diode and a method for controlling the apparatus.

Recently, the digital versatile disc (hereinafter, referred to as DVD) attracts an attention as a high-density optical disc capable of recording large-volume digital information. However, as the information volume increases, the optical disc should have a higher density. Here, in order to achieve a higher density of recording than a DVD, it is necessary to record a mark smaller than the DVD on the recording layer. For this, the light source should have a short wavelength and the objective lens should have a large numerical aperture (hereinafter, referred to as NA). For example, in the case of DVD, a laser having wavelength of 660 nm is used as the light source, and a lens having NA of 0.6 is used as the objective lens. The Blu-ray Disc (hereinafter, referred to as BD) uses a laser having a wavelength of 405 nm as the light source and the objective lens having NA of 0.85, thereby achieving the recording capacity multiplied by 5 as compared to the DVD. Furthermore, recently, the blue laser has acquired a higher output and in order to obtain a higher recording capacity than a so-called single-layer disc having one recording layer, a multi-layer disc having a plurality of recording layers is being developed. For example, if a dual-layer recording disc is realized, the recording capacity can be 10 times higher than the DVD. However, in the conventional high-density optical disc apparatus, various storage margins upon reproduction are strict as compared to the DVD and it is impossible to ignore the affect of the quantization noise (quantization noise: noise generated when the laser diodes emits light) of the blue laser as the light source. Thus, as the recording density becomes higher and higher, the affect of the quantization noise generated by the laser diode upon light emission becomes larger. In order to solve this problem, there has been suggested to use an attenuator. Here, the attenuator is an element to attenuate a laser power (laser power: energy in w per unit time) of the light emitted from the laser diode. The attenuator may use, for example, an ND filter, a liquid crystal element, and a diffraction grating.

Use of an element such as an attenuator to attenuate the light intensity is disclosed, for example, in JP-A-2003-257072 ((Abstract), (0005) to (0018)) and JP-A-2004-199755 ((Abstract), (0014), (0072), (0073)).

JP-A-2003-257072 discloses a technique to arrange an optical element capable of changing light attenuation between a laser diode and an optical disc and changes the light attenuation factor in accordance with the type of the optical disc. Thus, even if the type of the optical disc is changed, the output power of the light source may be increased to a high power, which makes the quantization noise sufficiently low, thereby realizing an optical disc apparatus for reproducing radiation power onto the recording layer of the optical disc as a low power not causing degradation of the recording layer or erase of data.

JP-A-2004-199755 discloses a technique to arrange an optical element capable of varying the light attenuation factor between the laser diode and the optical disc so that the light is attenuated only during a low-power operation. Thus, during a low-power operation, it is possible to reduce the quantization noise and prevent a disc recording layer destruction and during a high-power operation, it is possible to avoid the laser power consumption increase and shortening of the service life.

Moreover, in general, when reproducing an optical disc, control is performed to maintain the laser power applied onto the optical disc surface to be constant. In the JP-A-2003-308623 ((Summary)), a monitor is arranged to measure a laser power immediately after being emitted from the laser so as to stabilize the laser output.

SUMMARY OF THE INVENTION

Hereinafter, explanation will be given on the operation when avoiding the affect of the quantization noise by using the aforementioned attenuator.

In order to avoid the affect of the quantization noise, it is possible to increase the laser diode emission power and obtain a good S/N (Signal/Noise) ratio. However, if the reproduction operation is performed with the high emission power, the recording layer may be degraded and data may be erased. This is because, the reproduction power is generally lower than the recording power and if the emission power is increased so much, the recording power is achieved during the reproduction operation. For this, firstly, light emission is performed with a good S/N ratio by a high emission power and then the light intensity may be attenuated by the attenuator before the laser beam is applied onto the optical disc recording layer. Thus, it is possible to realize reproduction with a good S/N ratio without degrading the recording layer or erasing data.

However, even if the attenuator is used to obtain a high-density recording, it is impossible to solve the problem that optical parts constituting the optical pickup have individual irregularities and temperature characteristics, which requires a change in the laser diode emission power while maintaining a constant irradiation power onto the optical disc recording layer.

This causes new problems such that the noise cannot be reduced sufficiently or that the laser may emit light with an excessively high power so as to compensate the temperature characteristics of the optical parts, which in turn shortens the laser service life or increases the power consumption.

These problems are not considered in JP-A-2003-257072, in JP-A-2004-199755, or in JP-A-2003-308623 and accordingly, no solutions for them are disclosed therein.

It is therefore a first object of the present invention to provide an optical disc apparatus capable of reducing the laser noise and performing good recording and reproduction operation even if the optical parts of the optical pickup have individual irregularities and temperature characteristics, and a method for controlling the apparatus.

Moreover, as has been described above, the attenuator may use, for example, an ND filter, a liquid crystal element, or a diffraction grating. However, the attenuator using the liquid crystal element may require several tens of ms to several hundreds of ms after application of the control voltage until the attenuation factor is changed. For this, when switching a recording operation to a reproduction operation, if the reproduction operation is started before increase of the attenuation factor of the attenuator is complete, the recording layer may be degraded and data may be erased. On the other hand, when switching from the reproduction operation to the recording operation, the attenuation factor of the attenuator is reduced so as to increase the irradiation power. However, if the recording operation is started before the reduction of the attenuation factor is complete, the irradiation power is insufficient and it is impossible to perform appropriate recording. Furthermore, if the emission power is increased so as to compensate the insufficient irradiation power, the laser service life may be shortened and the power consumption may be increased.

These problems are not considered in JP-A-2003-257072, in JP-A-2004-199755 (corresponding to US2004/0125724 A1), or in JP-A-2003-308623 and accordingly, no solutions for them are disclosed therein.

It is therefore a second object of the present invention to provide an optical disc apparatus requiring a time for change of the light attenuation factor but capable of reducing the laser noise and realizing a good recording or reproduction operation and a method for controlling the apparatus.

In order to achieve the aforementioned object, an optical disc apparatus according to an aspect of the present invention includes: a pickup having a laser diode, a first power monitor, a second power monitor, and an attenuator; and a control unit. According to a first embodiment of the present invention, the first power monitor is arranged between the laser diode and the optical disc and monitors a first laser power emitted from the laser diode; the second power monitor is arranged between the first power monitor and the optical disc and monitors a second laser power applied to the optical disc; and the attenuator is arranged between the first power monitor and the second power monitor and attenuates the first laser power. The present invention is not to be limited to the present embodiment.

Moreover, a control method according to another aspect of the present invention is a method for controlling an optical disc apparatus which records information onto an optical disc or reproduces information from the optical disc, wherein a first laser power of a laser beam emitted from a laser diode is attenuated to a second laser power by an attenuator before being applied to the optical disc; and the first laser power and the second laser power are detected.

According to the present invention, it is possible to provide an optical disc apparatus capable of reducing the laser noise and obtaining a good recording or reproduction operation and a method for controlling the apparatus.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing the relationship between a laser diode emission power and a RIN (Relative Intensity Noise).

FIG. 4 shows an example for changing the light attenuation factor in accordance with the optical pickup initial optical system efficiency and the reproduction power.

FIG. 6 is an example of a flowchart for deciding the light attenuation factor upon shipment of the optical disc apparatus.

FIG. 7 is an example of a flowchart showing the processes from the moment when the optical disc apparatus starts the light attenuation factor change until it starts reproduction or recording.

DETAILED DESCRIPTION OF THE EMBODIMENTS

Here, four types of laser power are to be distinguished from one another. They will be briefly described below.

"Emission power" is a laser power after emission from the laser diode and before passing through optical parts, i.e., the laser power before attenuated by the optical parts.

"Irradiation power" is a laser power after emission from the laser diode and passing through the optical parts and then to be applied to the recording layer of an optical disc. (Since the laser power is attenuated when passing through the optical parts, the irradiation power is lower than the emission power.)

"Reproduction power" is generally defined according to the type of the optical disc or for each of the recording layers when the optical disc has two or more recording layers. The "reproduction power" is a laser power capable of reproducing information without causing degradation of the recording layer or erase of data. (In order to reproduce information without causing degradation of the recording layer or erase of data, control should be made to make the irradiation power and the reproduction power almost identical. Generally, the reproduction power is lower than the recording power which will be detailed later.)

"Recording power" is a laser power required when recording information onto an optical disc. Like the reproduction power, the recording power is generally defined by the type of the optical disc or for each of the recording layers when two or more recording layers are provided. (In general, the recording power is higher than the reproduction power.)

Description will now be directed to embodiments of the present invention with reference to the attached drawings.

Embodiment 1

Explanation will be given on an example of the optical disc apparatus which changes the light attenuation factor of the attenuator according to the optical system efficiency of the optical pickup according to the embodiment.

Figure 1A:
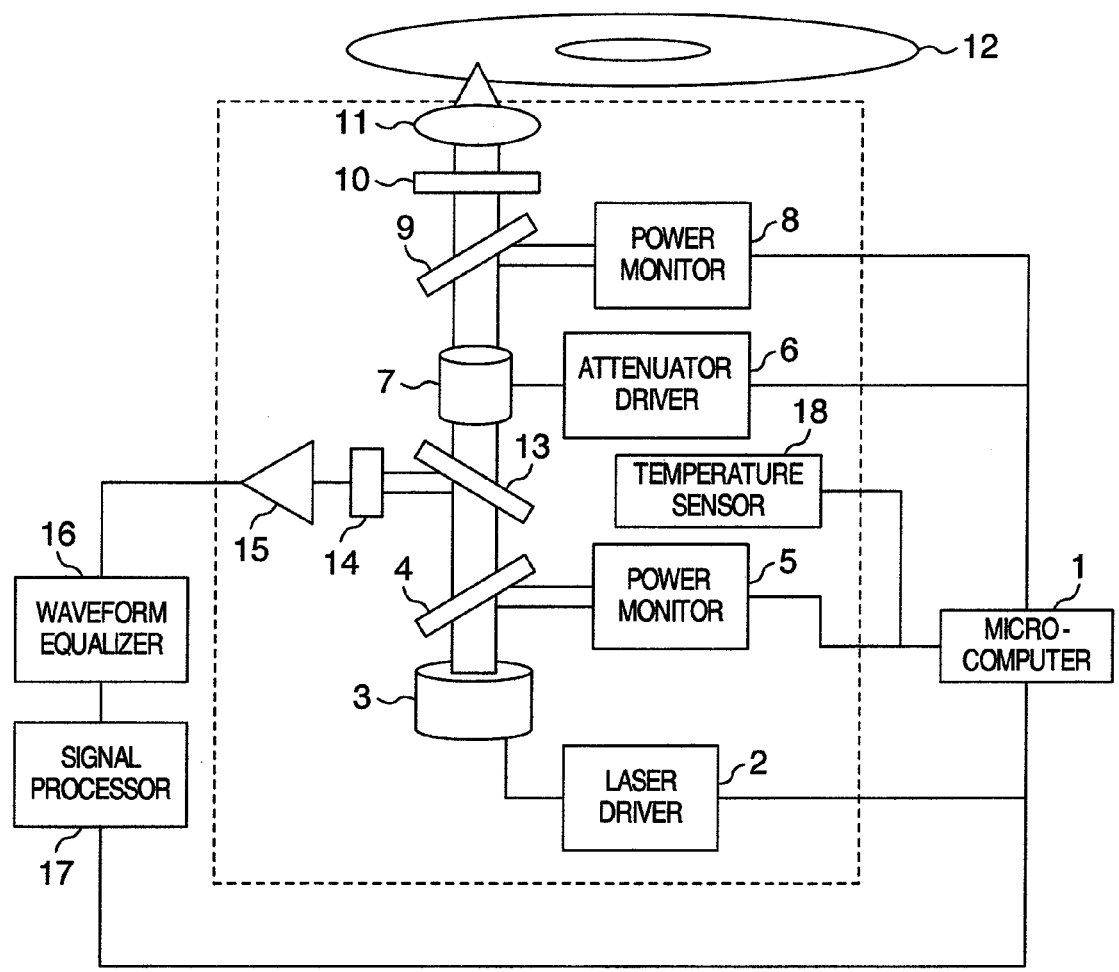
FIG. 1A is a block diagram showing an optical disc apparatus according to an embodiment of the present invention.

FIG. 1A is a block diagram showing an optical disc apparatus according to the embodiment of the present invention. A microcomputer 1 performs light emission control such as recording and reproduction onto/from a laser driver 2. The laser driver 2 outputs current to drive a laser diode 3. The laser diode 3 emits a laser beam having a wavelength of, for example, 400 nm with a light emission waveform corresponding to the output of the laser driver 2. A power monitor 5 and a power monitor 8 are detectors which detect information, such as the light intensity. The power monitor 5 detects an emission power of the laser diode 3 via a beam splitter 4, converts the detected power into a voltage value, and outputs it to the microcomputer 1. An attenuator driver 6 outputs a control voltage to the attenuator and controls the light attenuation factor. The power monitor 8 detects the irradiation power of the laser beam applied to the optical disc 12 via the beam splitter 9 and converts the detected power into a voltage value for output to the microcomputer 1. The light which has passed through the beam splitter 9 changes the polarization direction by a ¼-wavelength plate 10 and collects light by an objective lens 11 onto the recording layer of an optical disc 12. The laser beam reflected by the optical disc 12 changes the polarization direction by the ¼ wavelength plate 10 and collects or converges light via the polarization beam splitter 13 so as to collect light in a photo detector 14. The photo detector 14 reads out a signal recorded in the optical disc 12 from the collected laser beam and outputs it as a current waveform to an amplifier 15. The amplifier 15 converts the output current waveform of the photo detector 14 into a corresponding voltage waveform for output to a waveform equalizer 16. The waveform equalizer 16 equalizes the voltage waveform outputted by an amplifier 15 and outputs it to a signal processor 17. The signal processor 17 subjects the voltage waveform outputted by the waveform equalizer 16 to analog/digital conversion, equalization, decoding, and other signal processing and outputs the decoded data to the microcomputer 1. The temperature sensor 18 measures the temperature inside the optical pickup and outputs the measurement result to the microcomputer 1. Via an interface such as ATAPI (not depicted), the microcomputer 1 communicates with a host device such as a PC. In the example of FIG. 1A, it is assumed that blocks 2-11, 13-15, 18 within a frame indicated by a dotted line are mounted on the optical pickup. FIG. 1A shows an example that the laser diode 3 and the power monitor 5 are separately mounted. However, it is also possible to use a laser diode by packaging the power monitor therein so that the detected power is outputted to the microcomputer 1, because such a pickup design may easily realize a space saving facilitate easy control.

Figure 1B:
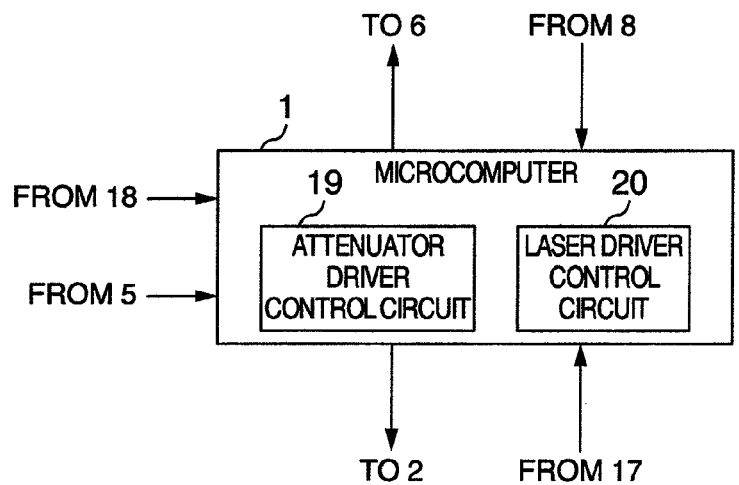
FIG. 1B shows an interior of a microcomputer 1 in FIG. 1A.

FIG. 1B is an enlarged example of the interior of the microcomputer 1 of FIG. 1A. In this embodiment, as shown in FIG. 1B, the microcomputer 1 includes an attenuator driver control circuit 19 and a laser driver control circuit 20. The attenuator driver control circuit 19 controls the attenuator driver 6 for driving the attenuator 7. The laser driver control circuit 20 controls the laser driver 2 so as to drive the laser diode 3. In this embodiment, the attenuator driver control circuit 19 and the laser driver control circuit 20 are arranged as hardware. It is also possible to use only one of them. Alternatively, it is also possible to realize them as software as microcomputer functions without arranging separate circuits like in the conventional microcomputer configuration. This facilitates space saving and control in the microcomputer design.

Here, the "optical system efficiency" is defined as a ratio (=P2/P1) of a first power P1 (=emission power) detected by the first power monitor 5 and a second power P2 (=irradiation power) detected by the power monitor 8.

Moreover, "the optical system efficiency" ratio is $\alpha$ which is "the initial optical system efficiency" when the attenuator light attenuation factor is 0%, i.e., the transmittance is 100%. The initial optical system efficiency represents the transmittance of the optical pickup when no attenuator is used and changes depending on the temperature change and the individual irregularities.

FIG. 2 indicates an example of the relationship between the laser diode emission power and the RIN (Relative Intensity Noise). The RIN is a quantity relatively indicating the laser noise against the emission power average value (DC component).

As shown in FIG. 2, it is known that the RIN changes depending on the emission power of the laser diode. More specifically, the RIN is high in the region where the emission power is low as shown in the region below A and as the emission power increases like in the region B and above, the RIN is lowered. That is, by increasing the emission power of the laser diode, it is possible to obtain a good S/N ratio (Signal/Noise ratio). It should be noted that if the laser diode emission power is lowered, the S/N ratio is lowered. If the emission power is increased in order to prevent this, the laser diode service life is shortened and the power consumption is increased. Accordingly, the laser diode emission power is preferably maintained in a good range, for example, above A and below B. Hereinafter, the RIN is used as the laser noise index.

Figure 3A:
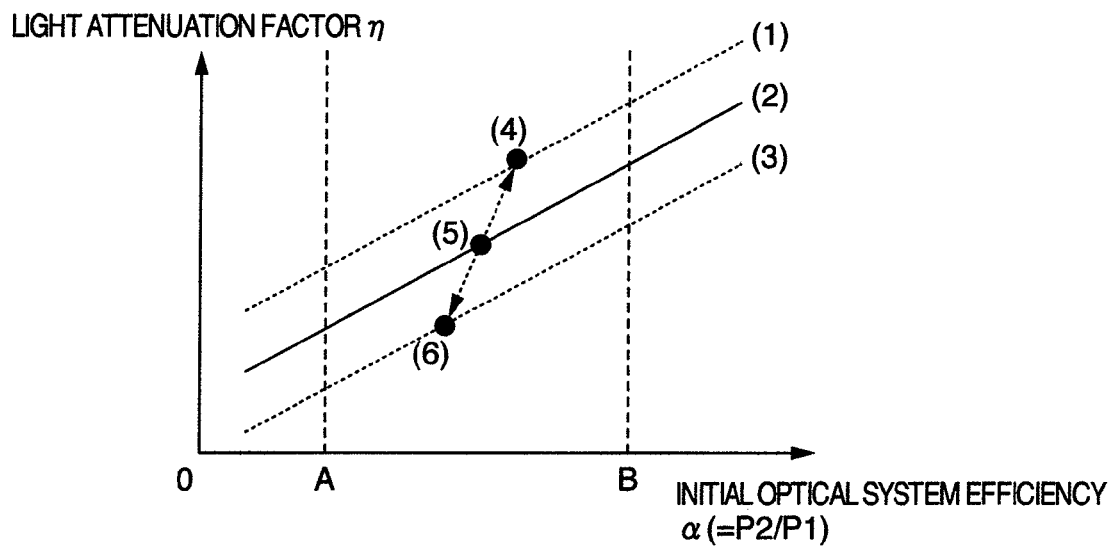
FIG. 3A shows an example for changing the light attenuation factor in accordance with an initial optical system efficiency of an optical pickup.

FIG. 3A is used when deciding the light attenuation factor $\eta$ of the attenuator and shows the relationship between the light attenuation factor $\eta$ and the initial optical system efficiency $\alpha$. As shown in FIG. 3A, the optical disc apparatus according to the present invention decides and changes the light attenuation factor depending on the initial optical system efficiency. For this operation, upon shipment from a factory, the light attenuation factor is set in the microcomputer as a function of the initial optical system efficiency as shown in FIG. 3A. If the setting is thus performed upon shipment, a user can easily reduce/control the setting time.

The relationship shown in FIG. 3A will be detailed below. It should be noted that (1) to (3) are separately expressed because the optical parts have temperature characteristics and the initial optical system efficiency and others may change depending on the pickup ambient temperature. As an example, in FIG. 3A, the pickup ambient temperature is relatively increased in the order of (1)>(2)>(3). Firstly, explanation will be given on the (2) as an example to solve the individual irregularities of the optical parts constituting the optical disc apparatus and then explanation will be given on (1) and (3) as cases considering the temperature characteristic of the optical parts.

In general, during reproduction operation of an optical disc apparatus, the irradiation power (=P2) is controlled to be constant so as to be matched with a predetermined reproduction power (APC control: Auto Power Control). For this, even when deciding the light attenuation factor $\eta$, the irradiation power P2 is made to be a constant reproduction power. Here, in the case of BD, the constant reproduction power is about 0.3 mW. If the reproduction power (about 0.3 mW) does not change, the P2 is also kept to be constant at about 0.3 mW. However, if the optical disc apparatus is changed, the irregularities of the respective optical parts of the optical disc apparatus are also changed and the initial optical system efficiency $\alpha$ is also changed. For this, the value of P1 (=emission power) required to obtain the constant P2 (about 0.3 mW) varies depending on each optical disc apparatus. That is, when an apparatus has a low initial optical system efficiency $\alpha$ like in A in the figure, the P1 (=emission power) required to obtain the constant P2 (about 0.3 mW) is high. On the other hand, when an apparatus has a high initial optical system efficiency $\alpha$ like in B in the figure, the P1 required to obtain the constant P2 (about 0.3 mW) is low.

Here, if the relationship between the emission power and the RIN is taken into consideration, a good S/N ratio cannot be obtained unless the emission power is maintained at a certain high level as has been described above.

For this, in the apparatus having a low initial optical system efficiency $\alpha$ like A in the figure, the light attenuation factor $\eta$ is set to a small value. The reason is as follows. In A, the P1 required to obtain the constant P2 (about 0.3 mW) is high and after the laser emission (before attenuated by the attenuator), the S/N ratio is already good. If the light attenuation factor $\eta$ is set high, the optical disc apparatus needs to further increase the P1 to maintain the good S/N ratio. As a result, the excessive emission power shortens the laser diode service life and increases the power consumption.

On the other hand, in the apparatus having a high initial optical system efficiency α like B in the figure, the light attenuation factor η is set to a large value. The reason is as follows. In B, the P1 required to obtain the constant P2 is low and it is impossible to obtain a good S/N ratio after the laser emission. For this, by keeping the light attenuation factor η set high, it is possible to increase the P1 while maintaining the P2 at a predetermined value and it is possible to obtain a good S/N ratio.

This is the detail of the relationship (2). Thus, by acquiring the relationship like (2) in FIG. 3A, it is possible to obtain the attenuation factor considering the individual irregularities of optical parts of the optical disc apparatus.

Subsequently, explanation will be given on FIG. 3A (1), (3) as examples to solve the problems even when optical parts have temperature characteristics in addition to the individual irregularities. The relationships in FIG. 3A (1), (3) are basically identical to the relationship in the aforementioned FIG. 3A (2) except for that the pickup ambient temperature is different.

Figure 3B:
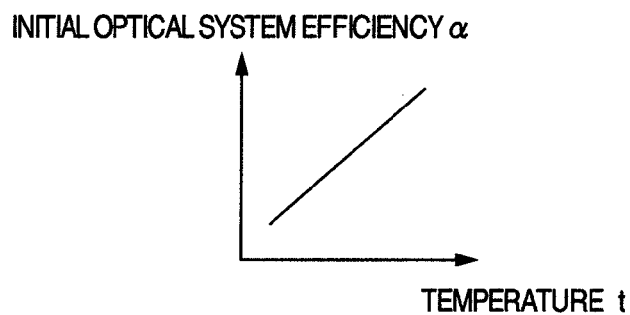
FIG. 3B shows an example of the relationship between the pickup ambient temperature t and the initial optical system efficiency α.
Figure 3C:
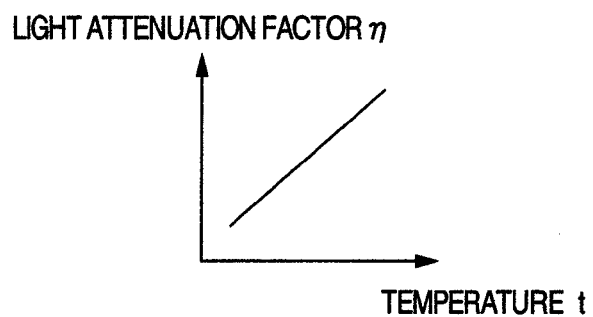
FIG. 3C shows an example of the relationship between the pickup ambient temperature t and the light attenuation factor η.

Here, FIG. 3B shows an example of the relationship between the pickup ambient temperature t and the initial optical system efficiency α. FIG. 3C shows an example of the relationship between the pickup ambient temperature t and the light attenuation factor η. In this embodiment, as shown in FIG. 3B, explanation will be given on a case when the pickup ambient temperature t increases and the initial optical system efficiency α of the optical disc apparatus also increases by the characteristic of optical parts. In order to compensate such temperature characteristic, in this embodiment, as shown in FIG. 3C, as the pickup ambient temperature t increases, the light attenuation factor η is also controlled to be high. As has been described above, in order to obtain a good S/N ratio, the light attenuation factor needs to be also set high when the initial optical system efficiency α is high.

FIG. 3A (1) shows a relationship between the initial optical system efficiency α and the light attenuation factor η when the pickup ambient temperature is higher than (2). On the other hand, FIG. 3A (3) shows a relationship between α and η when the pickup ambient temperature is lower than (2). Even if optical disc apparatuses use the same optical parts, when the pickup temperature changes, α and η also change. This will be explained by using the black circles (4) to (6) in the figure.

In case of (4), the pickup ambient temperature is higher than in (5) and accordingly, the initial optical system efficiency α is increased according to the relationship of FIG. 3B. For this, in order to obtain a good S/N ratio, the light attenuation factor η needs to be also increased as shown in the figure. (6) shows a case opposite to this.

The relationships (1) and (3) of FIG. 3A and the characteristics based on the temperature change like FIG. 3B and FIG. 3C may be measured upon shipment from a factory, for example, and set in a microcomputer. When the setting is made upon shipment from the factory, a user can reduce the time required for setting and easily control the apparatus.

Thus far has been described on FIG. 3A (1) and (3). By obtaining the relationships such as the FIG. 3A (1), (3), FIG. 3B, and FIG. 3C in advance, it is possible to obtain the attenuation factor considering the temperature characteristic in addition to the individual irregularities of the optical parts of the optical disc apparatus.

It should be noted that explanation has been given on a case that the light attenuation factor is continuously changed, it may also be changed discretely against the initial optical system efficiency. In this case, a table of the light attenuation factors depending on the initial optical system efficiency may be set in the microcomputer or the like. This simplifies the microcomputer control.

As has been described above, when the relationships as shown in FIG. 3A have been stored in the microcomputer of each optical disc apparatus in advance, it is possible to easily obtain the light attenuation factor η when each optical disc apparatus has measured the initial optical system efficiency α. Thus, even if each optical disc apparatuses have irregularities in their optical parts, each optical disc apparatus can easily select a light attenuation factor appropriate for its initial optical system. Thus, it is possible to avoid the shortening of the laser service life and increase of the power consumption and to achieve a good S/N ratio irrespective of the individual irregularities.

Furthermore, when the relationships (1) and (3) in FIG. 3A and the characteristics based on the temperature change like in FIG. 3B and FIG. 3C have been stored in a microcomputer of each optical disc apparatus, it is possible to select an appropriate light attenuation factor even if the initial optical system efficiency is changed due to the temperature characteristic.

Next, explanation will be given on an case for obtaining a light attenuation factor while considering a change in the optical disc reproduction power in addition to a change of the initial optical system efficiency α when the changes occur. FIG. 4 is an example of a table used when changing the attenuator light attenuation factor while considering the optical disc reproduction power in addition to the initial optical system efficiency α. Even when using an optical pickup having the same initial optical system efficiency, the emission power needs also to be lowered when, for example, the type of the optical disc is changed, making it necessary to lower the reproduction power. Thus, when the emission power is lowered, as has been described above, the RIN is increased. Accordingly, when the reproduction power is also taken into consideration, it is possible to obtain a good S/N ratio by increasing the light attenuation factor and increasing the emission power when lowering the reproduction power.

This relationship is shown in FIG. 4. In the figure, the horizontal axes $\alpha_L$, $\alpha_M$, $\alpha_H$ represent the initial optical system efficiencies which are assumed to be in the relationship of: $\alpha_L < \alpha_M < \alpha_H$. Further, the vertical axes $P_H$, $P_M$, $P_L$ represent reproduction powers which are assumed to be in the relationship of: $P_H > P_M > P$. The η11 to η33 corresponding to the respective α and P represent the light attenuation factor η.

As has been described above, as the reproduction power is lowered, the light attenuation factor is increased. To achieve this, when the initial optical system efficiency is made to be constant at $\alpha_L$, as the reproduction power is changed from $P_H$ to $P_L$, the light attenuation factor is changed in such a way that η11<η21<η31. This holds true with η12 to η32 when the efficiency is constant at $\alpha_M$, and also with η13 to η33 when the efficiency is constant at $\alpha_H$.

Moreover, as has been described above, since the light attenuation factor is increased as the initial optical system efficiency becomes higher, when the reproduction power is made to be constant at $P_H$, the light attenuation factor is changed like η11<η12<η13 as the initial optical system efficiency is changed from $\alpha_L$ to $\alpha_H$. This holds true with η21 to η23 when the efficiency is constant at $P_M$, and also with η31 to η33 when the efficiency is constant at $P_L$.

In the figure, the dotted arrow indicates the sequence of the increase of the light attenuation factor.

Thus, even when the reproduction power is changed, it is possible to obtain a reproduction condition for a good S/N ratio. Like the relationships shown in FIGS. 3A to 3C, the relationship shown in FIG. 4 may be set in a microcomputer upon shipment from the factory, for example. If the setting is made upon shipment from the factory, a user can reduce the time required for setting and easily perform control.

Here, the change of the reproduction power may occur in such cases as: (i) when the optical disc changes as described above, (ii) when the reproduction speed changes, (iii) in an optical disc having a plurality of recording layers, when reproduction is started in a different layer from the layer from which reproduction has been performed. The change of reproduction power will be detailed below for each of the cases (i) to (iii).

In the case of (i), since each of the optical disc has a recording layer made of different materials and having different transmittances, the reproduction power is also changed. In the case of (ii), for example, when the CAV (Constant Angular Velocity) method is used for the reproduction operation, since the operation is performed at the constant angular velocity, the linear speed is slower in the inner circumference and the linear speed is faster in the outer circumference. Here, in general, as the linear speed is increased, the reproduction power required for the reproduction is increased. Accordingly, during the reproduction of the CAV method, the reproduction power required for the reproduction operation is increased from the inner circumference toward the outer circumference. In the case of (iii), since the recording layers are stacked in an overlapping relation in an optical disc having a plurality of recording layers, the transmittance is changed and the reproduction power required for the respective layers are different.

Thus, by changing the light attenuation factor by considering the reproduction power, it is possible to obtain the same effect explained in FIGS. 3A to 3C also in the cases of (i) to (iii).

It should be noted that explanation has been given on the case that the light attenuation factor $\eta$ is changed in three steps for the initial optical system efficiency $\alpha$ and the reproduction power. However, the number of steps may be changed in accordance with the characteristic of the laser diode. Moreover, it is possible to continuously change the light attenuation factor $\eta$ for the initial optical system efficiency $\alpha$ and the reproduction power. This is because it becomes possible to change the light attenuation factor $\eta$ for various reproduction powers.

Thus, according to the methods above, it is possible to obtain the light attenuation factor when the reproduction power of an optical disc has changed in addition to the change of the initial optical system efficiency $\alpha$. Thus, even if the reproduction power of an optical disc is changed, it is possible to obtain the light attenuation factor $\eta$ of the attenuator considering the change.

Figure 5A:
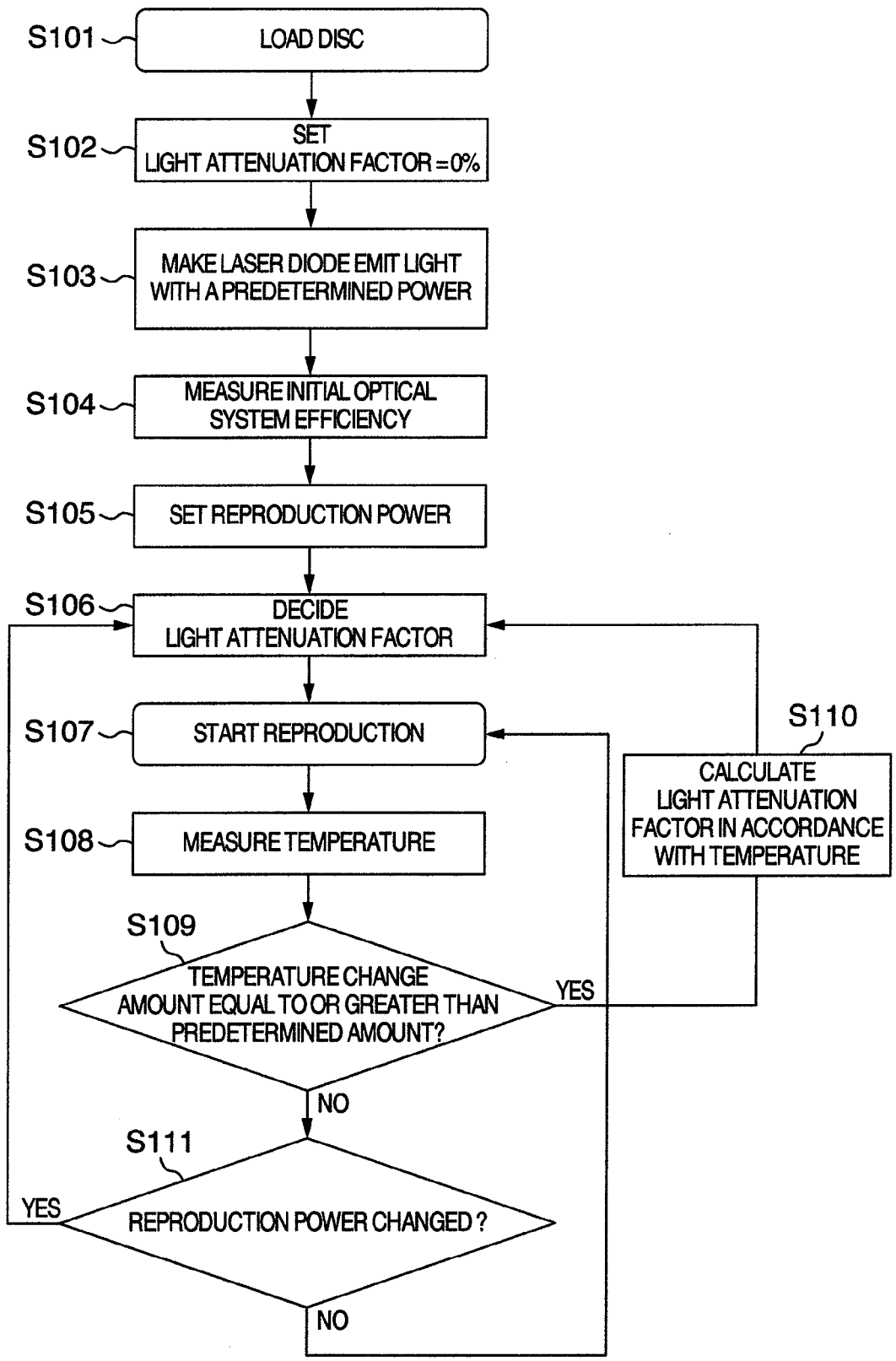
FIG. 5A and FIG. 5B are examples of flowcharts for a user to change the light attenuation factor in accordance with the initial optical system efficiency in the optical disc apparatus.
Figure 5B:
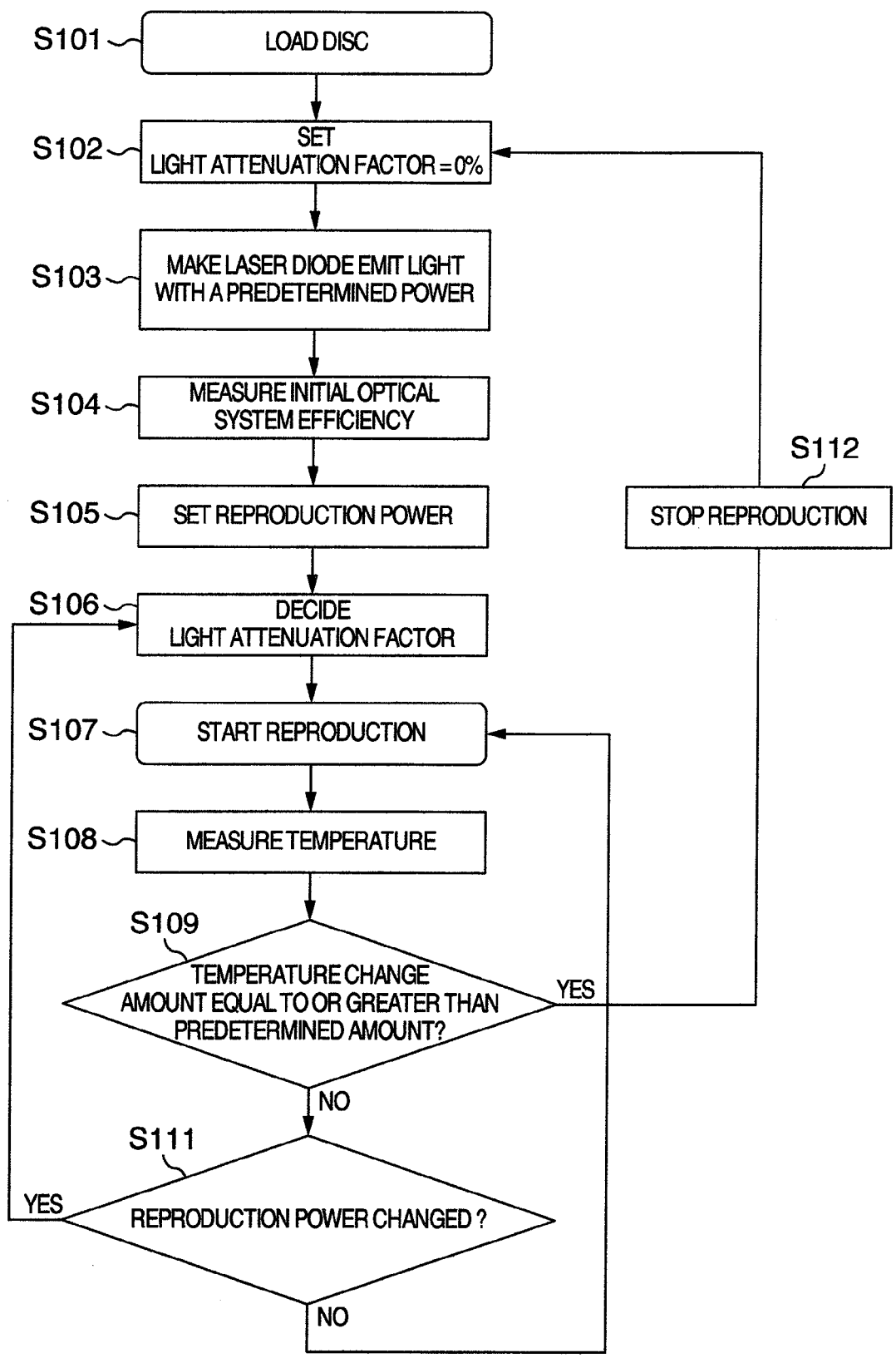

FIGS. 5A and 5B are examples of flowcharts for changing the attenuator light attenuation factor in accordance with the initial optical system ratio when a user uses the optical disc apparatus having the microcomputer containing the relationships shown in FIGS. 3A to 3C and FIG. 4. Here, processes from the optical disc insertion to the reproduction operation are explained.

An optical disc is inserted in S101 and then S102 sets the attenuator light attenuation factor to 0%, i.e., the transmittance 100%. S103 makes the laser diode emit with a predetermined emission power. Here, the predetermined emission power is such an emission power that the power applied to the optical disc is 0.3 mW, for example, as described above. This can be obtained by performing APC control by using the power monitor 8 in FIG. 1A. Thus, by performing emission of the same degree as when the power applied to the optical disc is reproduced, it is possible to avoid the degradation of the recording layer of the optical disc or erase of recorded information.

S104 measures the initial optical system efficiency from the power monitor 5 and the power monitor 8 in FIG. 1A and S105 sets a reproduction power in accordance with the optical disc. It should be noted that the reproduction power may be set according to the result of reading of the disc information and the like recorded on the optical disc or may be set by using the information decided in advance according to the type of the optical disc and/or the reproduction speed and stored in a memory or the like of the optical disc apparatus. When the disc information recorded on the optical disc is read and used, it is possible to secure the memory capacity. When using the information stored in a memory or the like of the optical disc apparatus, it is possible to reduce the processing time.

S106 decides and changes the light attenuation factor in accordance with the measured initial optical system efficiency and the set reproduction power as shown in FIGS. 3A to 3C or FIG. 4. After this, S107 starts reproduction. It should be noted that when the reproduction power does not fall in any of the aforementioned (i) to (iii), the light attenuation factor may be decided only in accordance with the initial optical system efficiency. This facilitates control in the microcomputer or the like and reduces the setting time for deciding the light attenuation factor.

Hereinafter, S108 measures the ambient temperature at an appropriate timing and S109 judges whether the temperature change amount is not less than a predetermined amount. If the temperature change amount is not less than the predetermined amount (for example, 30-40 degrees C.), the light attenuation factor is changed, because when the optical pickup ambient temperature is changed, as has been described with reference to FIG. 3, the initial optical system efficiency is changed and the light attenuation factor needs also to be changed.

In this case, the light attenuation factor is changed during the reproduction operation. In the case of the optical disc apparatus having the relationship between the temperature characteristic and the light attenuation factor like FIG. 3A (1), (3), FIG. 3B, 3C in the microcomputer or the like, control is passed to S110 of FIG. 5A so as to obtain the light attenuation factor $\eta$ corresponding to the temperature after the change. This shortens the time required for the processing and it is possible to cope with the temperature change without interrupting the reproduction operation.

On the other hand, in the case when the optical disc apparatus does not have the relationship between the temperature characteristic and the light attenuation factor in the microcomputer or the like, control is returned from S109 to S102 like in FIG. 5B. In this case, the reproduction operation is temporarily stopped in S112 and S102 to S106 are performed. If the light attenuation factor is made to 0% like in S102, the irradiation power may abruptly increase, which may degrade the recording layer and erase the data. It should be noted that after the reproduction operation is temporarily interrupted, the pickup may be moved to a trial write region or the like on the recording layer of the optical disc before performing S102 to S106. Moreover, the S102 to S106 may be performed after deactivating the tracking servo and focus servo. This avoids the danger of erroneously destroying or erasing the user information and assures the safe operation of S102 to S106.

It should be noted the aforementioned appropriate timing may be, for example, a periodic timing or an arbitrary timing specified by a user. If a periodical timing is used, it is possible to reduce the load on a user to monitor the temperature. If a user is to specify an arbitrary timing, it is possible to cope with a sudden temperature change, for example.

If in S109, the temperature change amount is less than the predetermined amount, S111 checks the reproduction power. When the reproduction power is changed like in the aforementioned (i) to (iii), S106 changes the light attenuation factor in accordance with the reproduction power. If the reproduction has not been changed, the reproduction operation of S107 is continued.

Moreover, if the transmittance change by the temperature change or the like is small for the optical parts constituting the optical pickup, it is also possible to omit the step S108 and after. In this case, the adjustment of the light attenuation factor is performed only during a setup from the disc-loading to the reproduction start, which facilitates control of the optical disc apparatus.

Moreover, in the aforementioned explanation, S102 sets the light attenuation factor to 0% and obtains the initial optical system efficiency α before obtaining a desired light attenuation factor. However, by acquiring the relationships of FIGS. 3A to 3C and FIG. 4 for the cases other than the case when the light attenuation factor is 0%, there is no need of changing the light attenuation factor to 0% when performing S102. Thus, it becomes possible to set an arbitrary attenuation factor in S102. This reduces the processing time and facilitates the control.

FIG. 6 is an example of a flowchart used to decide the light attenuation factor upon shipment of an optical disc apparatus from a factory. S201 sets the light attenuation factor to 0%. S202 makes the laser diode emit light with a predetermined power. S203 measures the initial optical system efficiency from the power monitor 5 and the power monitor 8 in FIG. 1A. S204 decides the light attenuation factor in accordance with the initial optical system efficiency measured as shown in FIGS. 3A to 3C. As for the optical parts constituting the optical pickup, when the transmittance change by the temperature change or the like is small, the attenuator may be used by fixing the light attenuation factor to the value decided by S204 when reproducing the optical disc hereafter. In this case, it is possible to reduce the time from the moment when the optical disc is inserted into the optical disc apparatus to the moment when the reproduction becomes ready. Moreover, the control hereafter is made easy.

As has been described above, even when the transmittance of the optical parts constituting the optical pickup is changed by the temperature change or the individual irregularities, it is possible to reduce the RIN and obtain a reproduction condition having a good S/N ratio by changing the light attenuation factor of the attenuator in accordance with the initial optical system efficiency of the optical pickup and the reproduction power. Moreover, it is possible to prevent shortening of the laser diode service life by the excessive emission power or increase of power consumption.

Embodiment 2

In this embodiment, explanation will be given on an optical disc apparatus which detects completion of a light attenuation factor change of an attenuator and a method for controlling the apparatus. The block diagram of the optical disc apparatus used in this embodiment is identical to FIGS. 1A, 1B explained in the first embodiment.

FIG. 7 is an example of a flowchart showing the processes from the moment when the optical disc apparatus starts changing the light attenuation factor of the attenuator to the moment when the reproduction or recording is started. The timing of the light attenuation factor change may be, for example, the disc-loading time, a periodical timing, an arbitrary timing specified by the user like the timings for performing S101, S109, S111, S112 in FIGS. 5A, 5B or the aforementioned (i) to (iii) when the reproduction power is changed. In addition to these, in this embodiment, it is also possible to use the timing when the reproduction operation and the recording operation are changed from one to the other. This is because, in general, the reproduction power is lower than the recording power and hence, during the reproduction operation, the light attenuation factor is set higher than during the recording operation and accordingly, when a change is made between the operations, the light attenuation factor is also changed.

In S301, the light attenuation factor change is started (the attenuator driver 6 instructs the attenuator 7 to change the attenuation factor) and then reproduction or recording is stopped in S302 if necessary. As has been described in the first embodiment, if the light attenuation factor is changed, the irradiation power is also changed, which may cause degradation of the recording layer and erase of data. It should be noted that it is possible to temporarily suspend the reproduction or the recording operation and the pickup is moved to a trial write region or the like on the recording layer of the optical disc before performing the subsequent steps. Alternatively, the subsequent steps may be performed after deactivating the tracking servo and the focus servo. Thus, it is possible to avoid erroneous destruction or erase of the user information and safely perform the subsequent steps.

Subsequently, in S303, the laser diode emits light with a predetermined irradiation power. Here, if the light attenuation factor is changed before performing the reproduction operation, control is performed so that the predetermined irradiation power is almost identical to the reproduction power. In this case, the irradiation power is, for example, 0.3 mW. The APC control may be performed by using the power monitor 8 in FIG. 1A. On the other hand, when the recording operation is performed after changing the light attenuation factor, control is performed so that the predetermined irradiation power is almost identical to the recording power.

In S304, the emission power of the laser diode is monitored by using the power monitor 5 in FIG. 1A. If the APC control is being performed, the emission power detected by the power monitor 5 is changed while the light attenuation factor is being changed. This is because the APC control functions so that the reproduction power or the recording power is constant by compensating the light attenuation factor change. S305 judges whether the change amount of the emission power per unit time is not greater than a predetermined amount. If the change amount of the emission power per unit time is not greater than the predetermined amount, it is judged that the light attenuation factor change is complete and S306 starts reproduction or recording operation. If the change amount of the emission power per unit time is greater than the predetermined amount, the light attenuation factor change is not complete and the monitor of the emission power of the laser diode is continued.

The aforementioned is the example of the optical disc apparatus which detects completion of the attenuator light attenuation factor change and the method for controlling it. As has been described above, when a power monitor is arranged before and after the attenuator, it is possible to monitor the change amount of the emission power per unit time when the light attenuation is changed. Thus, even if the optical disc apparatus requires a time for a change of the light attenuation factor, it is possible to reduce the laser noise without shortening the laser diode service life or increasing the power consumption and to perform a good recording or reproduction operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disc apparatus which records information onto an optical disc or reproduces information from the optical disc, the apparatus comprising:
   a laser diode which emits a laser beam;
   a first power monitor which is arranged between the laser diode and the optical disc and detects a first laser power emitted from the laser diode;
   a second power monitor which is arranged between the first power monitor and the optical disc and detects a second laser power applied to the optical disc;
   an attenuator which is arranged between the first power monitor and the second power monitor and attenuates the first laser power; and
   a control unit which controls the attenuator;
   wherein the control unit controls the attenuator by using information from the first power monitor and information from the second power monitor.

2. The optical disc apparatus as claimed in claim 1, wherein the control unit changes an attenuation factor of the attenuator by using a ratio between first laser power and the second laser power.

3. The optical disc apparatus as claimed in claim 2, wherein the ratio is the second laser power/the first laser power; and
   when the ratio is lowered, the attenuation factor is also lowered.

4. The optical disc apparatus as claimed in claim 2,
   wherein the attenuation factor is changed after the optical disc is inserted into the optical disc apparatus and before reproduction or recording operation is started.

5. The optical disc apparatus as claimed in claim 2, the apparatus further comprising:
   a temperature sensor which measures a temperature in an optical pickup;
   wherein during a reproduction operation time period during which the optical disc apparatus is reproducing information from the optical disc, if a change amount of the temperature is not less than a predetermined value, the first laser power and the second laser power are measured and, according to a ratio therebetween, the attenuation factor is changed.

6. An optical disc apparatus which records information onto an optical disc or reproduces information from the optical disc, the apparatus comprising:
   a laser diode which emits a laser beam;
   a first power monitor which is arranged between the laser diode and the optical disc and detects a first laser power emitted from the laser diode;
   a second power monitor which is arranged between the first power monitor and the optical disc and detects a second laser power applied to the optical disc;
   an attenuator which is arranged between the first power monitor and the second power monitor and attenuates the first laser power; and
   a control unit which controls the attenuator;
   wherein when the control unit instructs the attenuator to change the attenuation factor while recording information onto the optical disc or reproducing information from the optical disc, the recording or the reproduction is stopped and then resumed when the change amount of the first laser power per unit time has become a predetermined value or below.

7. An optical disc apparatus which records information onto an optical disc or reproduces information from the optical disc, the apparatus comprising:
   a laser diode which emits a laser beam;
   a first power monitor which is arranged between the laser diode and the optical disc and detects a first laser power emitted from the laser diode;
   a second power monitor which is arranged between the first power monitor and the optical disc and detects a second laser power applied to the optical disc;
   an attenuator which is arranged between the first power monitor and the second power monitor and attenuates the first laser power; and
   a control unit which controls the attenuator;
   wherein when a ratio between the first laser power and the second laser power changes, the attenuation factor of the attenuator is changed.

8. An method for controlling an optical disc apparatus which records information onto an optical disc or reproduces information from the optical disc, comprising the steps of:
   attenuating a first laser power of a laser beam emitted from a laser diode to a second laser power by an attenuator and applying the second laser power to the optical disc; and
   detecting the first laser power and the second laser power;
   wherein information from the first laser power and information from the second laser power are used to control the attenuator.

9. The optical disc apparatus control method as claimed in claim 8,
   wherein the attenuation factor of the attenuator is changed according to the ratio between the first laser power and the second laser power.

10. The optical disc apparatus control method as claimed in claim 9,
    wherein the ratio is the second laser power/the first laser power; and
    when the ratio is lowered, the attenuation factor is lowered.

11. The optical disc apparatus control method as claimed in claim 9,
    wherein the attenuation factor is changed after the optical disc is inserted into the optical disc apparatus and before reproduction or recording operation is started.

12. The optical disc apparatus control method as claimed in claim 9,
    wherein the optical disc apparatus further comprises a temperature sensor which measures a temperature in an optical pickup;
    wherein during a reproduction operation period during which the optical disc apparatus is reproducing information from the optical disc, if a change amount of the temperature is not less than a predetermined value, the first laser power and the second laser power are measured and, according to a ratio therebetween, the attenuation factor is changed.

13. The optical disc apparatus control method as claimed in claim 9,
    wherein if the attenuation factor of the attenuator is to be changed while recording information onto the optical disc or reproducing information from the optical disc, the recording or the reproduction is stopped and then resumed when the change amount of the first laser power per unit time has become a predetermined value or below.

* * * * *